United States Patent [19]

Morgan

[11] Patent Number: 4,628,071
[45] Date of Patent: Dec. 9, 1986

[54] EMULSION COPOLYMERIZATION PROCESS

[75] Inventor: Lee W. Morgan, Racine County, Wis.

[73] Assignee: S. C. Johnson & Son, Inc., Racine, Wis.

[21] Appl. No.: 752,878

[22] Filed: Aug. 16, 1985

Related U.S. Application Data

[63] Continuation of Ser. No. 584,662, Aug. 21, 1984, abandoned.

[51] Int. Cl.$^4$ ............... C08F 2/22; C08F 220/06
[52] U.S. Cl. .................................. 524/832; 526/80; 526/87; 526/318.6; 526/347; 526/937
[58] Field of Search ............. 526/87, 317, 318.6, 526/937, 80; 524/832

[56] References Cited

U.S. PATENT DOCUMENTS

| | | | |
|---|---|---|---|
| 4,048,413 | 9/1977 | Wilkens | 526/87 X |
| 4,112,215 | 9/1978 | Boessler et al. | 526/317 X |
| 4,358,403 | 11/1982 | Distler et al. | 526/304 X |

OTHER PUBLICATIONS

CA 95:43929p (1981).

Primary Examiner—Joseph L. Schofer
Assistant Examiner—F. M. Teskin

[57] ABSTRACT

An emulsion polymer of a water insoluble vinylic monomer and an acrylic monomer is formed by precharging a portion of the acrylic monomer and thereafter adding a comonomer charge corresponding to the final desired composition of the vinylic monomer and acrylic monomer at an addition rate generally corresponding to the steady state monomers concentration. A high non-volatiles content is maintained to inhibit the acrylic monomer from partitioning into the aqueous phase.

7 Claims, No Drawings

EMULSION COPOLYMERIZATION PROCESS

This is a continuation of co-pending application Ser. No. 584,662 filed on Aug. 21, 1984, now abandoned.

BACKGROUND OF THE INVENTION

This invention relates to preparation of lower molecular weight alkali soluble polymers by aqueous emulsion polymerization. In particular, it relates to preparation of clear, homogeneous, alkali-soluble acrylic addition copolymers.

It has long been desired to prepare low molecular weight, acid-containing polymers in a low pressure, conventional reactor, which exhibit a uniformity of composition normally associated with polymers prepared in solution. Conventional solution polymerization techniques employ large quantities of expensive solvents, which must be recovered by high-temperature stripping for economic operation, which procedure may create safety problems. In addition, until now, it has proven difficult to prepare a homogeneously distributed low molecular weight copolymer product, utilizing emulsion polymerization techniques of a highly water soluble and water insoluble monomer.

Monoalkenyl aromatic and acrylic addition copolymers having a number average molecular weight ($M_n$) from about 1000 to 8000 and a weight average molecular weight ($M_w$) from about 3000 to 20,000 have sometimes been designated "solution polymers". Such acid-containing, alkali soluble copolymers are widely utilized in inks, floor finishes, paper coatings, paints and adhesives. For commercial use, these copolymers are often prepared in concentrates of high solids content. Often they are converted to water soluble "resin cuts" by reaction with a suitable base. To maintain satisfactory low viscosity, clarity and color, such "solution" polymers should exhibit a relatively uniform composition and a low polydispersity index ($M_w$)/($M_n$), usually less than about 3, preferably less than about 2.5.

Heretofore, aqueous emulsion systems were unsuitable for preparation of "solution polymers" of homogeneous composition and relatively narrow molecular weight distribution, which were capable of yielding clear, non-viscous ammoniacal solutions (resin cuts). Highly water soluble monomers, especially acrylic acid monomer, tend to partition strongly into the aqueous phase and tend to form an acrylic homopolymer which is either water soluble or might form either as a shell around the water insoluble monomer/copolymer particles or as an induced coagulum. In addition water insoluble monomers, such as styrene, tend to form homopolymers as the core of the polymer particle, since the water soluble monomers tend to prefer the aqueous phase during initiation of polymerization.

For those reasons and others, emulsion copolymerization of a water insoluble monomer with more than about 10 mole percent of water soluble acrylic monomers have mostly proved unsuccessful. Researchers usually can incorporate from about 2 to 8 mole percent of acrylic monomers into such addition polymers by emulsion polymerization. The results are said to suggest that for acrylic acid monomer, its polymerization sites tend to be on the shell surface or subsurface regions of the latex particle, see Jour. Poly. Sci. Vol. 20, 863–874 (1982); Vestn. Slov. Kem. Drus. 29 /2/ p. 91–102 (1982).

To overcome this problem, an approach was developed which promoted the solubility of acrylic acid monomer in the water insoluble comonomer (styrene) phase to yield a higher acrylic acid content copolymer. This approach utilized concentrated salt solutions to reduce the solubility of acrylic acid in the aqueous phase. This proposed process did not succeed owing to the adverse effects on surface and interfacial tension created by the use of concentrated salt solutions as set forth in U.S. Pat. No. 3,862,924.

Other researchers studying emulsion polymerization of compolymer resins have confirmed that significant polymeric initiation takes place in the aqueous phase or on the latex' surface, rather than in the latex' core site, see Jour. Appl. Poly. Sci., Vol. 23, 893–901 (1979) and Jour. Appl. Poly. Sci., Vol. 20, 2583–2587 (1976). Accordingly, conventional emulsion polymerization techniques simply do not permit successful preparation of clear resin cuts of homogeneous copolymers of acrylic acid and insoluble monomers.

When insufficient acrylic monomer is available in the micelle, then homopolymers of water insoluble monomers can form. Such homopolymers (of polystyrene, for example) reduce the clarity of the resulting polymer product and render it useless for many solution polymer applications. When acrylic acid monomer homopolymerizes on the latex' surface, the resulting polymer product forms more viscous resin cuts, which reduces their utility, significantly. Such polymer products are not simply interpolymers of water soluble and water insoluble monomers, but contain blocks of homopolymers of such monomers, rendering the polymer heterogeneous, rather than homogeneous, in composition.

A successful process for preparing homogeneous copolymers of water soluble and water insoluble monomers has been illustrated in U.S. Pat. No. 4,410,673. In order to incorporate substantial amounts of water soluble monomers, such as acrylic acid, in such polymers it was noted that initiation and polymerization in the aqueous phase was to be avoided to prevent emulsion polymerization and that initiation must occur only in the polymer droplet. For that reason a polar, water insoluble cosolvent, usually in amounts from 10 to 50% based on solids and capable of partitioning the water soluble monomers into a polymer droplet, was employed. After use, the cosolvent was subjected to a complex separation process to recover it for reuse.

It was also disclosed that for best results a precharge of both water insoluble and water soluble monomers should be employed in amounts up to the steady state monomers composition (the free monomers composition). It was further disclosed that the addition rate of the balance of the comonomers charge should be less than the polymerization rate to yield the desired products. The addition rate of the comonomers charge was said to be from ½ to 3 hours.

Accordingly, a key feature of that process was said to be the use of significant amounts of a polar cosolvent to partition the water soluble monomer into the water insoluble monomer/copolymer droplet in order to prepare polymers having a high water soluble monomer content. Use of such a cosolvent created the need for equipment and for processing time to separate and recover the cosolvent from the process (for reuse) and the need for possible purification of the copolymer product to remove traces of cosolvent contamination.

It has also been disclosed that for semicontinuous bulk copolymerization of styrene and butyl acrylate at low feed rates the composition of the resulting copolymer is generally a function of the monomer feed composition, see *Jour. Appl. Polym. Sci.*, Vol. 20, 1753-1764 (1976).

It is also generally accepted in the art that when precharging comonomers is deemed desirable that at least the slower-reacting monomer, such as styrene monomer, is always included in the precharge to promote the reaction rate. It has also been reported that where water soluble monomer has been precharged (together with water insoluble monomer) that (i) copolymers of high polydispersity and higher molecular weight tend to form and (ii) homopolymers of water soluble monomer form which result in heterogeneous, viscous, copolymers, see ACS Symposium Series 165, *Emulsion Polymers & Emulsion Polymerization*, pp. 415-436, Basset and Hamielec, 1981.

SUMMARY OF THE INVENTION

As employed herein the term "acrylic monomer" includes acrylic acid, either alone or admixed with unsaturated monomer.

As employed herein, the term "alkali soluble polymer" refers to the vinylic polymer formed from the free radical polymerization of a water insoluble vinylic monomer and an acrylic monomer.

It is, accordingly, an object of this invention to provide an aqueous emulsion polymerization process capable of producing clear, non-viscous, acid-containing, alkali-soluble polymers having homogeneous compositions.

This and other objects are attained by conducting an aqueous emulsion polymerization process for preparing a homogeneous, low molecular weight alkali soluble polymer from a water insoluble vinylic monomer and an acrylic monomer which comprises:

(a) forming an aqueous precharge of sufficient acrylic monomer to inhibit formation of homopolymers of said water insoluble vinylic monomer and to promote formation of a homogeneous copolymer of said water insoluble vinylic monomer and said acrylic monomer, (b) adding a comonomers charge of said water insoluble vinylic monomer and said acrylic monomer to said acrylic monomer precharge, wherein the weight ratio of said comonomers in said charge corresponds to a preselected ratio for said comonomers in the alkali soluble polymer and wherein the addition rate of said comonomers charge is no greater than the polymerization rate for said comonomers at a steady state condition; and (c) maintaining a sufficient solids concentration during said polymerization reaction to reduce the tendency of said acrylic monomer to partition into said aqueous phase.

It has been generally accepted that during emulsion copolymerization between a water insoluble monomer, as styrene, and a water soluble monomer, as acrylic acid, there exists a tendency for the styrene monomer to preferentially fill the surfactant micelle and to homopolymerize, since the acrylic acid monomer tends to prefer to remain in the aqueous phase. Accordingly, a polymer particle tends to form having polystyrene core. Once that core forms, an interpolymer of styrene and acrylic acid tends to form a protective colloid -type sphere about the polystyrene core. Finally, with the styrene charge having been exhausted, the remaining acrylic acid tends to homopolymerize as an outer shell around the polymer particle. The final polymer product, accordingly, is said to exhibit polystyrene blocks, which reduce the polymer solubility in alkali solution, and acrylic homopolymer blocks at the shell surface, which in alkali solution raise the solution viscosity of the polymer.

The present process meets the problem of how to prevent homopolymers of the comonomers from forming and from comprising the homogeneity of the copolymer. It has now been discovered that by precharging a portion of the acrylic monomer the tendency of the product to form a homopolymer of water insoluble monomers at the core, is reduced or eliminated. This precharge step, in turn, is made feasible by the discovery that the acrylic monomer precharge does not immediately homopolymerize, as expected, to form a polyacrylic acid core. There exists a short period of time before the acrylic monomer homopolymerization kicks off. During this period it is postulated that an acrylic acid enriched micelle can form. Thereafter, during addition of the styrene-acrylic acid comonomer charge, the presence of the excess acrylic monomer in the micelle can drive the reaction to form a homogeneous styrene-acrylic interpolymer core. That core forms the stable, homogeneous copolymer nucleus from which the polymer particle can grow. The styrene charge then tends to gravitate to that core, rather than to an isolated polystyrene nucleus. Accordingly, to prevent homopolymerization of the acrylic precharge, no initiator is employed in the precharge but rather initiator is added immediately preceding and/or simultaneously with the comonomers charge. Further, the comonomer charge is started promptly after the precharging step.

During the polymerization step, it has been discovered that to form a copolymer of a preselected ratio of comonomers which exhibits good homogeneity, the water insoluble monomer should be bathed in acrylic monomer at all times. Accordingly, by starving the process from water insoluble monomer and by providing a comonomer feed generally equivalent to the desired ratio of monomers in the copolymer product, it has been found that in the semicontinuous emulsion polymerization process of the invention, a homogeneous polymer is formed.

In addition, in order to reduce the tendency of the acrylic monomer to dissolve in the water phase and to homopolymerize during the reaction, it has been found that the reaction should be conducted at a high solids (non-volatiles) content. That has the effect, it is postulated, of depriving the acrylic monomer from an otherwise limitless reservoir of water in the continuous phase.

DETAILED DESCRIPTION OF THE INVENTION

Unless otherwise indicated, all weight percentages herein are based upon the total weight of the reaction mix after the addition of all constituents. The weight of "solids" refers to the weight of non-volatiles in the reaction mix.

Emulsion polymerization, as the term is employed herein, is a process which requires comonomers, an initiator, an emulsifier, water as the continuous phase, and a chain transfer agent for regulating the molecular weight of the resulting polymer.

In the first step of the process of the invention a portion of the acrylic monomer is precharged to a reactor. A sufficient amount of said acrylic monomer is precharged to promote the formation of a homogeneous water insoluble vinylic monomer and acrylic monomer is precharged addition polymer core droplet. If insufficient acrylic monomer is present in the precharge, resin cuts of the resulting polymer exhibit undesirably higher optical densities. For this purpose sufficient acrylic monomer is precharged so that throughout the polymerization the micelles and particles attain a steady state of both monomers so as to provide copolymer of relatively uniform composition.

The acrylic monomer precharge can include a significant proportion of the entire acrylic monomer charge. While the upper limit of acrylic monomer precharged is not critical, nonetheless, if excess acrylic monomer is precharged, then some acrylic homopolymer may form which would adversely effect homogeneity. Accordingly, the upper limit of precharge is that which, under the reaction conditions, forms acrylic homopolymer. One measure of that limit is the viscosity of the resulting polymer product as formed in a resin cut.

For most purposes at least about 0.5 weight percent of acrylic monomers, based on the total weight of the comonomers is employed in the precharge. Enhanced results are obtained, when from about 2 to 25% by weight of acrylic monomers is precharged and best results are usually obtained when the precharged acrylic monomer is from about 4 to 8% by weight of the total comonomers.

In order for the polymer product to exhibit acceptable homogeneity, polymerization must take place in the emulsion droplet entirely, and steady state conditions should be maintained. Comonomer, initiator, emulsifier and chain transfer feeds should act to transport these ingredients rapidly and uniformly through the aqueous phase into the particle bead and replace the monomers and adjuvants which have been consumed by the reaction.

For a true steady state conditions to occur, the rate of polymer formed, $R_p$, must equal the rate of monomers addition, $R_f$ and the steady state monomer concentration must remain unchanged, i.e., $$d[M]/d_t = 0$$

wherein [M] is the monomer concentration.

Increasing $R_f$ correspondingly increases $R_p$, and this is accomplished by an accompanying increase in steady state monomer concentration [M]. As the concentration of water insoluble monomer increases, the likelihood that some undesired homopolymerization will occur also increases.

Thus, at a given temperature, increasing $R_f$ increases the steady state monomer concentration, [M], but does not affect the steady state monomer conversion rates, i.e., $$Rp = constant\ [M]$$

Accordingly, it is preferred, in order to maintain a high ratio of arylic monomer to water insoluble vinylic monomer, to utilize a slow feed rate for the comonomers addition. For this purpose it is preferred to add the comonomers charge to the reaction over a sufficiently extended period to keep the free, water insoluble, vinylic monomer content to less than about 0.5% by weight, and less than the polymerization rate of said monomers. In general, the slower the addition of comonomers, the better the homogeneity of the polymer. Preferred results are obtained with an addition rate of from about 1.5 to 4 hours, though shorter and longer rates are possible depending upon reaction parameters. Best results are obtained with an addition rate of about 2 to 3 hours.

The composition of the comonomers feed is a factor to be considered in the present process. In general, at the low addition rates of the present invention, the copolymer formed will be a function of the ratio of comonomers in the feed composition. Accordingly, to form a copolymer of a desired molar proportion of acrylic monomer and water insoluble vinylic monomer, the feed composition should be adjusted to that desired ratio and should be maintained at that level during the process.

The composition of the comonomers feed may be changed during the addition, if required. It may become desirable to incrementally measure the concentration of unreacted vinylic monomer during the course of the reaction and to adjust the ratio of vinylic monomer to acrylic monomer in response to changes thereto. In general, the present process is able to provide homogeneous polymers of water insoluble vinylic monomers and acrylic monomers in which the molar proportion of acrylic monomer is from about 5 to 95%, preferably from 8% to 65%, and most preferably from 10% to 50%.

In order to ensure that the excess acrylic monomer present during the reaction does not dissolve or homopolymerize in the aqueous continuous phase, it is preferred to maintain a relatively high solids content during the course of the polymerization. In general a solids content of at least about 15% by weight should be maintained. Best results are attained, when the solids content is from about 18% to 45% by weight.

Initiation is a factor in the polymerization process and is important for the preparation of homogeneous products. In order to successfully carry out the polymerization, initiation and polymerization in the acrylic monomer precharge must be avoided. Therefore, it is essential that the initiator be excluded from the precharge. To enhance initiator efficiency, to provide desired polymerization rates and to provide product of finer particle size, it may be preferable to gradually add initiator to the reaction mix. Precharging initiator prior to the onset of polymerization or rapidly adding initiator may yield premature destruction of initiator from the high radical concentrations produced. Employing high polymerization temperatures also induces early consumption of initiator. For best results often the initiator is uniformly added to the process with the comonomers charge.

For these and other purposes low temperature initiators are preferred. Typical initiators include organic peroxides, such as benzoyl, caproyl, lauroyl, cylohexanone and decanoyl peroxides and perester initiators, such as tert-butyl peroxypivalate and tert-butyl peroctoate. Best results are attained with persulfate initiators and, especially, with ammonium persulfate. Mixtures of such initiators may also be employed.

In general, from about 0.25 to 2 mole percent of initiator based on a stoichiometric conversion of total monomers charge, is employed. The particular identity and quantity of initiator selected will depend, in part, upon the desired polymerization rate, the comonomers addition rate, the reaction temperature and the like.

If desired, a post-addition of initiator, subsequent to the final monomers addition, may be employed to drive the reaction to completion. As the quantity of initiator employed is increased over about 2 mole percent or decreased below about 0.25 mole percent, the degree of heterogeneity of the copolymer product tends to increase.

Selection of appropriate chain transfer agents for molecular weight control is important for obtaining homogeneous, low molecular weight polymers. Chain transfer agents must be efficient, inexpensive, exhibit high transfer activity, produce controllable molecular weight distribution and not adversely affect the polymerization rates. While conventional chain transfer agents may be employed which meet such standards, the preferred chain transfer agents are nontoxic mercaptocarboxyl acids having 2 to 8 carbon atoms, and their esters. Examples of suitable chain transfer agents are mercaptoacetic acid, 2-mercaptopropionic acid, 3-mercaptopropionic acid, mercaptovaleric acid, 2-mercaptobenzoic acid, mercaptosuccinic acid, mercaptoisophthalic acid and alkyl esters thereof. It is preferred to employ a mercaptomonocarboxylic acid and/or a mercaptodicarboxylic acid containing 2 to 6 carbon atoms, more particularly, a mercaptopropionic acid, and alkyl esters thereof. Best results are obtained with the isooctyl ester of mercaptopropionic acid.

In general, there is a reduction in polymerization rate and an increase in steady state monomer concentration with increasing addition levels of chain transfer agent. Accordingly, no greater than about 4 mole percent of chain transfer is employed based on total molar weight of the monomers charge. On the other hand, as the addition level of chain transfer agent is reduced, both the polymer product polydispersity index and molecular weight increases, since chain transfer activity is reduced. Accordingly, no less than about 1 mole percent chain transfer agent is normally employed. If it is desired to make higher molecular weight polymers with higher polydispersity, then the amount of chain transfer agent employed can be reduced to below 1 mole % and usually to at least about 0.3 mole %.

The chain transfer agent is normally added to the reaction mix incrementally, along with the monomers and initiator. A portion of the chain transfer agent is added to the acrylic monomer precharge, usually in the same relative proportion as the acrylic monomer. For most purposes, the precharge preferably contains about 5% of the entire charge of chain transfer agent.

In general, an emulsifier is added to the process together with the initiator, chain transfer agent, and comonomers. The preferred emulsifier is usually an anionic emulsion polymerization surfactant. Typical emulsifiers include alkali esters of sodium sulfosuccinic acid, alkali metal sulfates and alkali metal sulfonates. A preferred surfactant is sodium lauryl sulfate.

The water insoluble vinylic monomer of the invention is preferably a monoalkenyl aromatic monomer, such as methyl styrene, tertiary butyl styrene or, most preferably, styrene. Other water insoluble vinylic monomers may be employed in this invention, including; methyl methacrylate, butyl acrylate and butyl methacrylate. It is possible to substitute for a portion of the water insoluble vinylic monomer, a relatively soluble vinylic monomer, such as vinyl acetate and methyl acrylate.

The acrylic monomer employed in the process of the invention includes acrylic acid, either alone or admixed with at least one other unsaturated water soluble monomer, such as methacrylic acid, esters of acrylic or methacrylic acid, hydroxyethyl methacrylate, methacrylonitrile, acrylonitrile or the like.

Other unsaturated acid monomers can also be substituted in part for the preferred acrylic acid. Such unsaturated acid monomers include; maleic acid, crotonic acid, fumaric acid and itaconic acid.

Typical preferred addition copolymers formed by the inventive process include: styrene/acrylic acid; styrene/ -methyl styrene/acrylic acid; styrene/butyl acrylate/acrylic acid and styrene/ethylacrylate/acrylic acid.

Especially preferred monomer charges include the comonomers, styrene and acrylic acid or the termonomers -methyl styrene/styrene/acrylic acid. While ratio of water-insoluble monomer to water-soluble monomer in that charge can vary widely, for the preferred styrene/acrylic acid system, the weight ratio of said monomers in the feed charge is preferably from about 2:1 to 1:1.

The produced alkali soluble polymers may be converted in situ to a conventional resin cut--an aqueous solution of the resin with an alkaline substance, preferably having a fugitive cation. Suitable bases for this purpose include sodium or potassium hydroxide and, preferably, ammonia or ammonium hydroxide. The preferred resin cut is a 10%-20% non-volatiles solution adjusted to a pH of about 9.0 with ammonia.

The optical density of the resin cuts can be measured as an indication of the homogeneity of the copolymers of the invention. The clearer the resin cuts, the lower the measured optical density and the more uniform the copolymer. In general, an optical density reading within the range from about 0.00 to 0.05 of a 5% nonvolatile, pH 9.4 solution indicates a very clear, homogeneous polymer, which is highly suitable for commercial purposes. Optical density readings between 0.05 and 0.1 are indicative of a slightly turbid resin cut. Copolymers forming such resin cuts may be blended in with other resin cuts having an optical density less than about 0.05. Such blended cuts are suitable for most commercial purposes. Copolymers exhibiting optical densities from 0.05 to 0.1 can be useful for certain applications, by themselves. However, the presence of turbidity indicates that some polystyrene homopolymer is present in the polymer product.

Resin cuts having an optical density between about 0.1 and 0.2 tend to be somewhat smokey in appearance. Such optical density readings are indicative of copolymers having significant heterogeneity. In general, the greater the quantity of polystyrene [or other poly(water insoluble) vinylic monomer] in the product polymer, the cloudier the resulting resin cut. In addition, the greater the measured viscosity of the resin cut, the greater the quantity of polyacrylic acid in the copolymer.

To assist in stabilizing the polymer product and to ensure reaction completion, it may be desirable to maintain the reaction mix at the desired reaction temperature for a period of up to about 1 hour after the final additions of comonomers, initiator, chain transfer agent and emulsifier.

In general, the process of the invention is conducted at the lower temperature range of conventional emulsion polymerization. For most purposes the reaction temperatures are maintained from about 70° C. to 90° C., and preferably at about 80° C. Employing higher reaction temperatures tends to produce copolymers having undesirably high optical densities.

The following examples are set forth to illustrate with more clarity the principles and practice of the invention to one with ordinary skill in the art. As such, these examples are not intended to limit the invention, but are merely illustrative of certain perferred embodiments.

EXAMPLE 1

Into a round bottomed resin reactor fitted with a paddle stirrer, thermocouple, condensor, dual addition funnel, nitrogen inlet and heating mantle was charged 832 grams of deionized water, and a precharge of 13 grams of acrylic acid (AA) and 0.1 gram isooctyl ester of mercaptopropionic acid (IOMPA) chain transfer agent. The resulting mixture was heated to about 80° C., while all lines were purged with nitrogen.

The main comonomers charge was immediately started into the resin reactor. The total charge consisted of 100 grams styrene, 87 grams acrylic acid, 1.9 grams of IOMPA, 2.0 grams of ammonium persulfate initiator, 6.0 grams of sodium lauryl sulfate emulsifier; and the 832 grams of deionized water constituted the aqueous phase.

The main monomers charge was gradually added over a 3 hour period with the reactor being stirred during the addition. The polymerization reactor was maintained at a temperature of 80° throughout the addition. The non-volatiles content of the reaction mix in the reactor was maintained at about 19.4%.

The polymer product was recovered as an aqueous emulsion analyzing at 50 styrene/50 acrylic acid. The resulting emulsion, when diluted and neutralized produced a clear, 5% non-volatiles ammonia cut exhibiting an optical density of 0.03.

COMPARATIVE EXAMPLE A

An emulsion polymerization employing styrene and acrylic comonomers was carried out in accordance with the procedure of Example 1 with the following exceptions: the level of chain transfer agent was 2% by weight as compared to 1% by weight in Example 1; the addition time for the main monomers charge was 1 hour; and no acrylic acid precharge was employed. The main monomers charge contained all the acrylic monomer.

The optical density of a 5% non-volatiles resin cut made from the resulting copolymer, was 0.12.

COMPARATIVE EXAMPLE B

An emulsion polymerization employing styrene and acrylic acid monomers was carried out in accordance with the procedure of Example 1 except that no acrylic acid precharge was employed and the entire monomers charge was directly introduced into the reaction vessel during a 30 minute addition time. The chain transfer agent was employed at a 2% level. The mole ratio of styrene to acrylic monomers during the addition was approximately 67:33 to provide a copolymer of 67 styrene/33 acrylic acid. That polymer, when formed into a 5% non-volatiles ammonia cut, exhibited an optical density of 0.9.

The comparative tests illustrate the need for a precharge of acrylic monomer and for a long addition time to conclude a successful emulsion polymerization of a water insoluble vinylic monomer and an acrylic monomer.

EXAMPLE 2

In order to determine the results obtained when the amount of acrylic monomer in the precharge was varied, two emulsion polymerization runs were carried out employing styrene and acrylic acid monomers in accordance with the procedure of Example 1. In the first run the level of chain transfer agent employed in the process was 2% by weight. The resulting 5% non-volatile resin cut exhibited an optical density of 0.03. The acrylic monomer precharge was 6% by weight of the total monomers content.

In the second run the comonomers charge addition time was 2 hours and the acrylic monomers precharge was 1½% of the total monomers employed. The ammonia resin cut formed from the resulting product exhibited an optical density of 0.03.

EXAMPLE 3

In order to illustrate the nature of the copolymers produced where the ratio of acrylic monomer to styrene in the feed was varied, several runs were conducted in accordance with the procedure of Example 1. In the first run the level of chain transfer agent was 2% by weight and the non-volatiles content during the reaction was 34.3%. The ratio of styrene to acrylic acid was adjusted to 60:40 in the feed so that the resulting copolymer analyzed at 60% styrene and 40% acrylic acid. An ammoniacal resin cut of that copolymer exhibited an optical density of 0.02.

In a second run the proportion of acrylic and styrene monomers were adjusted to provide a product copolymer of 55 styrene/45 acrylic acid. That polymer exhibited an optical density when cut, of 0.025.

EXAMPLE 4

In order to investigate the effects on the process of raising the non-volatiles content, two runs were conducted in accordance with the procedures set forth in Example 1. During the first run the chain transfer level was at 2% by weight and the ratio of styrene to acrylic acid was adjusted to provide a copolymer of 67% styrene/33% acrylic acid. During the reaction the non-volatiles (N.V.)level was maintained at 41.5%. A resin cut of the resulting copolymer exhibited an optical density of 0.04.

In a second run the chain transfer level was also maintained at 2% by weight. The non-volatiles level was maintained at 34.6% during the reaction. The resulting copolymer had a number average molecular weight (Mn) of 5910, a weight average molecular weight (Mw) of 23,790 and exhibited an optical density of 0.02.

EXAMPLE 5

In order to determine the feasibililty of employing the process of the invention to prepare higher molecular weight copolymers, a run was conducted generally in accordance with the procedure set forth in Example 1. During this run the total amount of chain transfer agent employed was reduced to 0.3 weight percent. The optical density of the resulting resin cut from the product copolymer was 0.06.

The molecular weight of the copolymer was not specifically determined, but was estimated to be between about 15,000 and 20,000 based on number average molecular weight.

When that test run was repeated employing 2% by weight of chain transfer agent, the resulting copolymer had a number average molecular weight of 7280, a weight average molecular weight of 16,830 and an optical density of 0.02.

COMPARATIVE EXAMPLE C

In order to determine the effects on the process when methacrylic acid (MAA) was substituted entirely for acrylic acid, two runs were conducted generally in accordance with the procedure of Example 1. In the first run, methacrylic acid was employed in both the precharge and the main monomers charge. The resulting copolymer of 50S/50MAA exhibited an optical density of 0.85, when converted to a 5% N.V. ammonia cut. In the second run no precharge was employed and methacrylic acid was substituted for acrylic acid in the feed. The resulting styrene/methacrylic acid copolymer exhibited an optical density on the order of 0.05 when converted to a 5% N.V. ammonia cut.

These results illustrate that for methacrylic acid-monoalkenyl monomer emulsion polymerizations, a precharge of the methacrylic acid adversely effected the product polymer. It is surprising, therefore, that precharging with a more water soluble monomer than methacrylic acid, improves the homogeneity of the resulting polymer, substantially.

The previous examples are illustrative only. Other variations and embodiments will be apparent to those with ordinary skill in the art. This invention is not to be limited except as set forth in the following claims.

What is claimed:

1. An aqueous emulsion polymerization process for preparing homogeneous, low molecular weight alkali soluble polymer from a water insoluble vinylic monomer and acrylic acid which comprises:
   (a) forming an aqueous precharge consisting essentially of sufficient acrylic acid to inhibit formation of homopolymers of said water insoluble vinylic monomer and to promote formation of a homogeneous copolymer of said water insoluble vinylic monomer and acrylic acid, said precharge being initiator free;
   (b) adding a comonomers charge of said water insoluble vinylic monomer and acrylic acid to said acrylic acid precharge in the presence of an initiator and a chain transfer agent, wherein the weight ratio of said comonomers in said charge corresponds to a preselected ratio of said comonomers in said alkali soluble polymer and wherein the addition rate of said comonomers charge is no greater than the polymerization rate for said comonomers at a steady state condition; and wherein (1) the polymerization reaction is starved of water insoluble monomer and (2) the initiator is added to the emulsion polymerization reaction mixture immediately preceding and/or simultaneously with the comonomers charge; and
   (c) maintaiing a sufficient solids concentration during said polymerization reaction to reduce the tendency of acrylic acid to partition into the aqueous phase.

2. The process of claim 1 wherein from about 2% to 25% by weight of acrylic acid, based on the total weight of the monomers employed, is present in the precharge.

3. The process of claim 1 in which the amount of acrylic acid in the precharge is about 4 to 8 weight percent based on the total weight of the monomers employed.

4. The process of claim 1 in which the total monomer charge is added over a period from about 2 to 3 hours.

5. The process of claim 1 in which the weight ratio of water insoluble vinylic monomer to acrylic acid in said comonomers charge is from about 2:1 to 1:1.

6. The process of claim 1 in which the concentration of non-volatiles in the process is maintained at from about 18% to 45% by weight based on the total weight of the aqueous emulsion.

7. The process of claim 1 in which the vinylic monomer is styrene.

* * * * *